(12) United States Patent
Maffe'

(10) Patent No.: US 10,793,215 B2
(45) Date of Patent: Oct. 6, 2020

(54) FRONT LUGGAGE RACK FOR A MOTORCYCLE WITH LOAD-BEARING SHELL

(71) Applicant: PIAGGIO & C. S.P.A., Pontedera (Pisa) (IT)

(72) Inventor: Francesco Maffe', Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 16/314,606

(22) PCT Filed: Jun. 30, 2017

(86) PCT No.: PCT/IB2017/053966
§ 371 (c)(1),
(2) Date: Dec. 31, 2018

(87) PCT Pub. No.: WO2018/002898
PCT Pub. Date: Jan. 4, 2018

(65) Prior Publication Data
US 2019/0315422 A1 Oct. 17, 2019

(30) Foreign Application Priority Data

Jul. 1, 2016 (IT) .......................... 102016000068660

(51) Int. Cl.
*B62J 7/06* (2006.01)
(52) U.S. Cl.
CPC ...................................... *B62J 7/06* (2013.01)
(58) Field of Classification Search
CPC ......... B62J 7/06; B62J 7/02; B62J 7/00; B62J 7/04; B62J 17/00
See application file for complete search history.

(56) References Cited

U.S. PATENT DOCUMENTS 3,948,424 A * 4/1976 Hunn .......................... B62J 7/06
224/413
6,010,173 A * 1/2000 Chyan-Luen ........ B60Q 1/2611
296/78.1

(Continued)

FOREIGN PATENT DOCUMENTS

FR 1065651 A 5/1954
JP S5745495 U 3/1982
JP S63192192 U 12/1988

OTHER PUBLICATIONS

Allstate Crusaire Piaggio Luggage Rack, https://www.searsallstateriders.com/accessories/28g094601.html, 1951-1954. (Year: 1951).*

(Continued)

*Primary Examiner* — Corey N Skurdal
(74) *Attorney, Agent, or Firm* — Cantor Colburn LLP

(57) ABSTRACT

A front luggage rack is described, for a motorcycle with a loading-bearing shell (20; 20'), the load-bearing shell having a front shell part and a shell part operatively facing downwards. The luggage rack
includes a luggage rack body; and
at least one anchoring element associated to the luggage rack body. The at least one anchoring element is configured so as to allow rigidly anchoring the luggage rack body in at least one point of the front shell part. The luggage rack body has two anchoring arms shaped so as to be able to be anchored to the shell part facing downwards; and
it further includes third and fourth anchoring elements associated respectively to the first and second anchoring arm, which are configured so as to allow rigidly anchoring the first and second anchoring arm to said shell part facing downwards.

11 Claims, 6 Drawing Sheets

(56) References Cited

U.S. PATENT DOCUMENTS

| | | | | |
|---|---|---|---|---|
| 7,293,951 B2* | 11/2007 | Meeks | ............... | B60P 1/4407 |
| | | | | 414/462 |
| 2010/0301592 A1* | 12/2010 | Longwell | ............... | B60R 9/06 |
| | | | | 280/769 |
| 2012/0061434 A1* | 3/2012 | Giguere | ............... | B62J 7/04 |
| | | | | 224/412 |

OTHER PUBLICATIONS

International Search Report for corresponding application PCT/IB2017/053966 filed Jun. 30, 2017; dated Sep. 27, 2017.
Written Opinion for corresponding application PCT/IB2017/053966 filed Jun. 30, 2017; dated Sep. 27, 2017.

* cited by examiner

US 10,793,215 B2

FRONT LUGGAGE RACK FOR A MOTORCYCLE WITH LOAD-BEARING SHELL

TECHNICAL FIELD

The present description relates to the technical field of luggage racks for motorcycles and more particularly it relates to a front luggage rack for a motorcycle with load-bearing shell, as defined in the preamble of claim 1.

BACKGROUND

Front luggage racks for motorcycles with load-bearing shell are known, such as front luggage racks for motor-scooters with load-bearing shell. In particular, front luggage racks with a pair of anchoring bolts through which the luggage rack is anchored to the shield of the motorcycle belong to the prior art. These luggage racks, in order to ensure stability and reduce the stresses of the luggage racks in the motorcycle operating conditions, are typically provided with a plurality of bearing pads, typically made of rubber, which constitute the supporting points for the luggage rack on the front part of the shell, namely on the shield of the motorcycle. The prior art luggage racks described above however have some drawbacks. In fact, in the first place, said bearing pads are particularly unsightly and adversely affect the appearance of the shield, which is one of the most valuable parts of the motorcycle from an aesthetic point of view. In addition, said pads, due to the stresses suffered by the luggage rack while riding the motorcycle, can leave marks or even warp the shield. Such undesired signs and/or deformations therefore remain visible even when the rack is removed and the motorcycle is used without the luggage rack.

A general object of the present description is to provide a front luggage rack for a motorcycle with load-bearing shell which is capable of solving or minimising the drawbacks mentioned above with reference to the prior art while ensuring a stable anchoring of the luggage rack to the motorcycle.

SUMMARY

This and other advantages are achieved by proving a front luggage rack for a motorcycle with load-bearing shell as defined in claim 1 in the most general form thereof and in the dependent claims in some particular embodiments thereof.

The present disclosure provides a load-bearing shell for a motorcycle as defined in claim 7 in the most general form thereof and in the dependent claims in some particular embodiments.

The present disclosure also provides a combination of a front luggage rack for a motorcycle with load-bearing shell and a load-bearing shell as defined herein.

The present disclosure also provides a motorcycle as defined herein.

BRIEF DESCRIPTION OF THE DRAWINGS

The disclosure will be better understood from the following detailed description of embodiments thereof, made by way of an example and therefore in no way limiting with reference to the accompanying drawings, in which.

DETAILED DESCRIPTION OF THE DRAWINGS

Figure 1:
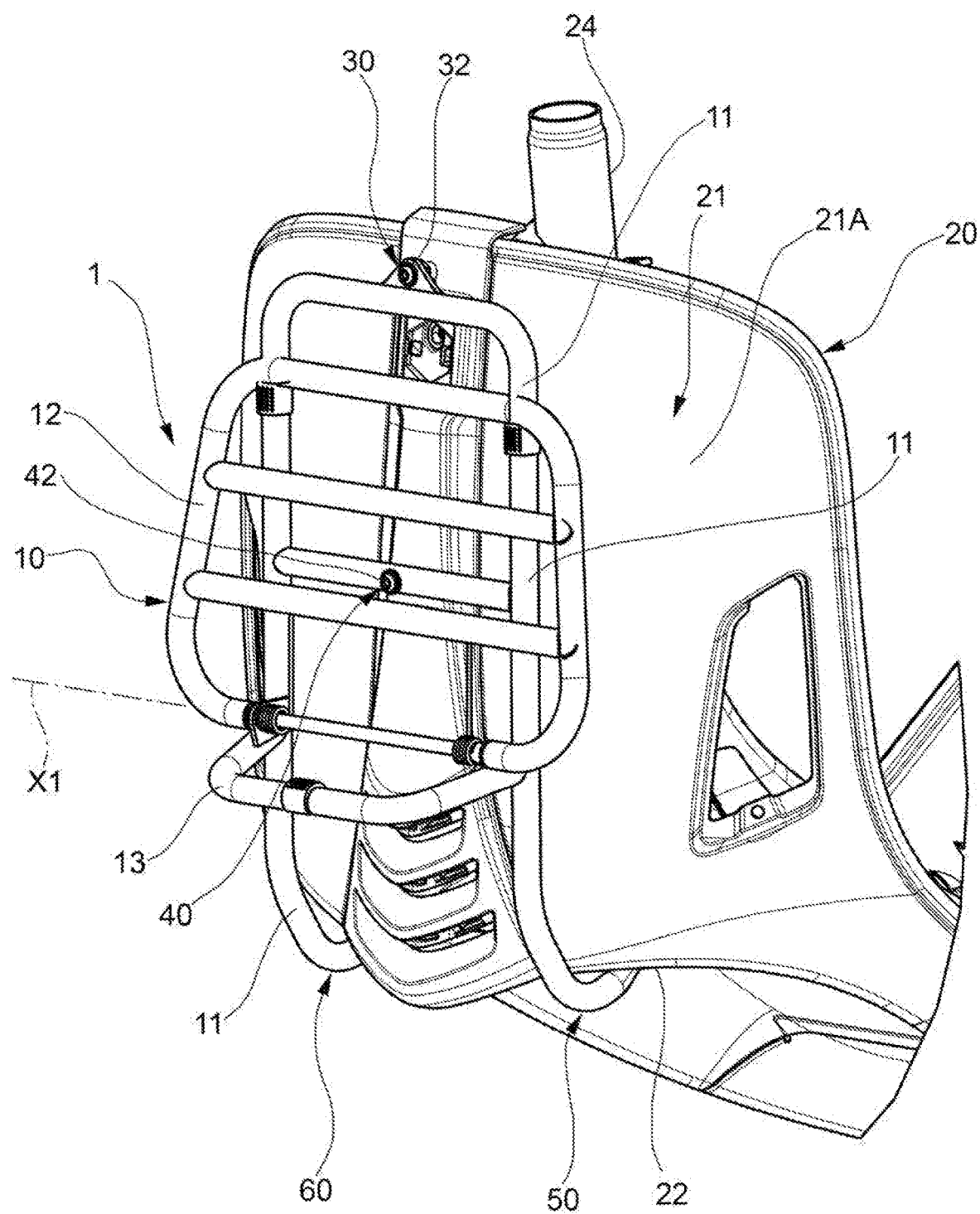
FIG. 1 is a front perspective view of a group of parts comprising a load-bearing shell of a motorcycle according to a currently preferred embodiment and a front luggage rack according to a currently preferred embodiment fixed to the load-bearing shell, the shell being partially shown in this figure.

In the accompanying figures, elements which are equivalent or similar will be indicated by the same reference numerals.

It is noted that in the present description, the terms "internal" and "external" refer to the centre of the shell to which a front luggage rack according to the present description is intended to be fixed.

It is also noted that in the present description, the words "high", "low", "lower", "higher", "vertical", "horizontal" are referred to a motorcycle including a load-bearing shell and a front luggage rack fixed to such a shell with reference to a normal condition of use of the motorcycle, where the motorcycle is not inclined.

With reference to FIGS. 1-4, these figures shows a combination of a front luggage rack according to a currently preferred embodiment, which has been indicated as a whole with reference numeral 1, and a load-bearing shell according to a currently preferred embodiment, which is partly shown in these figures and is indicated as a whole with reference numeral 20. In particular, in FIGS. 1-4, rack 1 is shown mounted to shell 20. The load-bearing shell 20, made of metallic material, is a load-bearing shell of a motorcycle, preferably a motor-scooter. In essence, FIGS. 1-4 show in practice also the combination of the front luggage rack 1 and a motorcycle with the load-bearing shell 20. For the sake of brevity of description, all the details of shell 20 and of a motorcycle including such a shell are not described and shown herein as they are widely known to the man skilled in the art. According to a preferred embodiment, shell 20 is made of moulded sheet. According to a preferred embodiment shell 20 includes a structural part and an aesthetic part, both made of moulded sheet, which are welded together to create shell 20. The structural part is suitable for example to support the engine and suspensions of the motorcycle. The aesthetic part includes the shield and the side bulges. It is noted that the teachings of the present description are in general applicable to all two- or three-wheeled motorcycles with load-bearing shell.

With reference to FIGS. 1-5, the front luggage rack 1 includes a luggage rack body 10. In particular, the luggage rack 1 includes first and second anchoring elements 30, 40 which are associated with body 10. As can be seen in FIG. 1, the first and second anchoring elements 30, 40 are spaced apart and configured so as to allow rigidly anchoring body 10 in two distinct points of a front shell part 21 of shell 20. According to a preferred embodiment, the front part 21 is a part of the front shield of shell 20. As can be seen for example in FIG. 1, when the luggage rack 1 is mounted to shell 20, the anchoring elements 30, 40 are vertically spaced apart. Preferably, elements 30, 40 are aligned with each other along a central axis of body 10. According to a preferred embodiment, the first and second anchoring elements 30, 40 are interposed between a first and a second anchoring arm 50, 60 of body 10.

Figure 2:
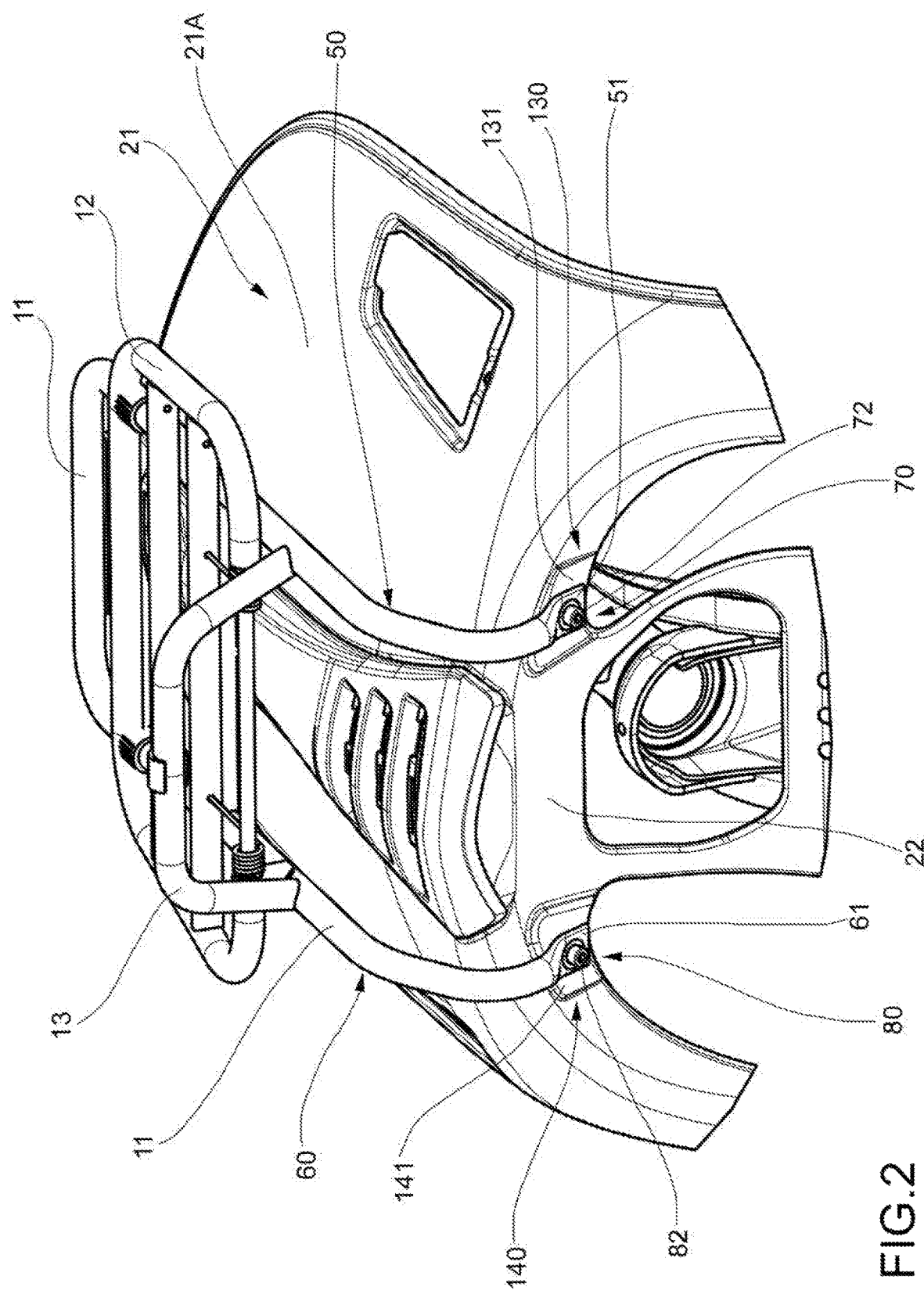
FIG. 2 shows a bottom perspective view of the group of parts in FIG. 1.
Figure 5:
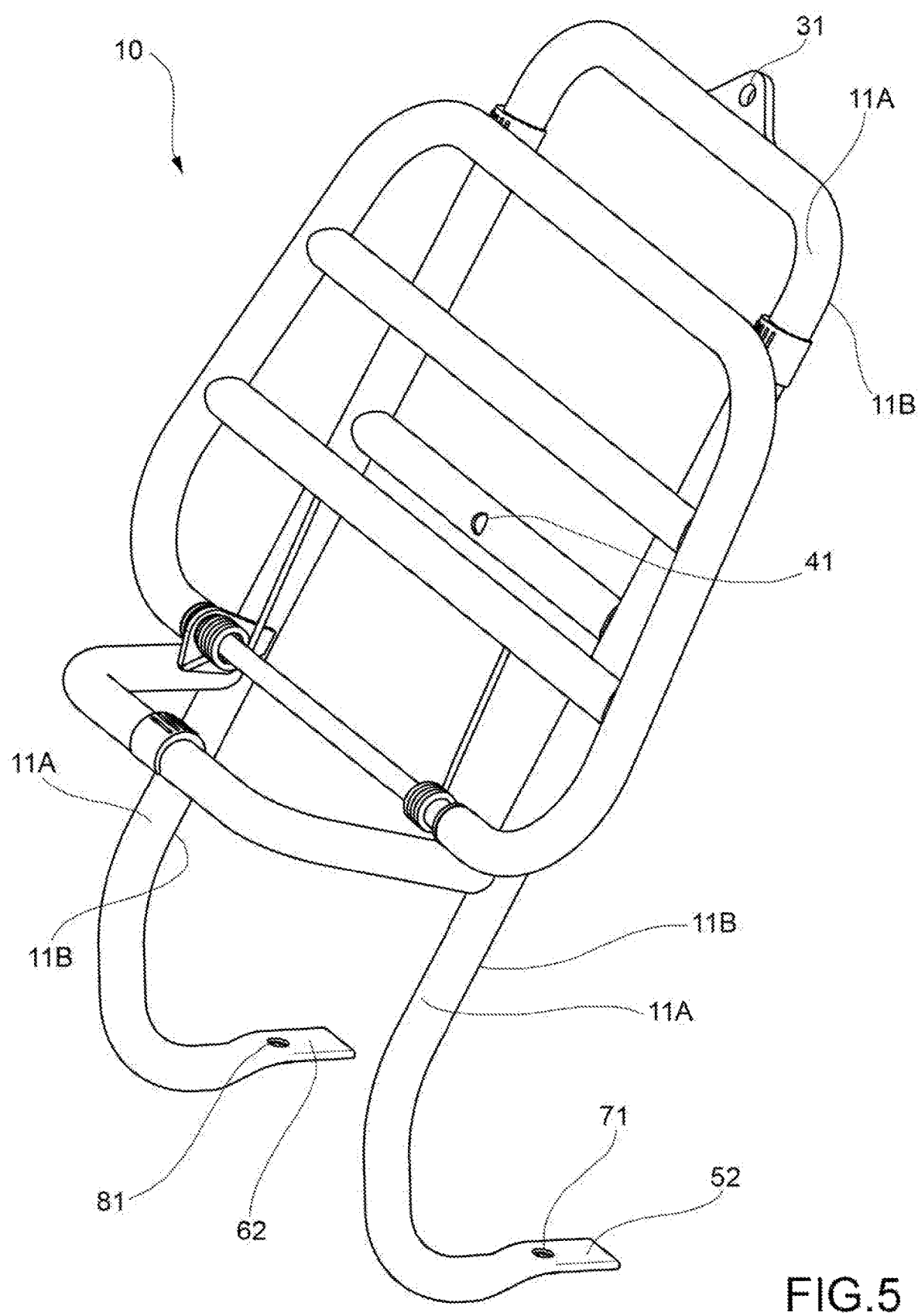
FIG. 5 is a front perspective view of the luggage rack body of the luggage rack in FIG. 1.

With reference for example to FIGS. 1, 2 and 5, the first and second anchoring arm 50, 60 are configured in such a way that they can be anchored to a shell part of the shell 20 facing downwards. According to a preferred embodiment, the shell part 22 is a part of the front shield of shell 20 which is operatively facing the ground or the front wheel of the motorcycle. The luggage rack 1 also comprises third and fourth anchoring elements 70, 80 (FIG. 2) which are associated respectively to the first and second anchoring arm 50, 60. The third and fourth anchoring elements 70, 80 are configured so as to allow rigidly anchoring the first and second anchoring arm 50, 60 to the shell part 22 facing downwards. It should be noted that the first and second anchoring arm 50, 60 can be made in a variety of different shape and therefore the shape of such arms is not limited to the shape shown in the appended figures. In particular, it should be noted that the shape of arms 50 and 60 shown in the appended figures is a shape selected essentially for aesthetic reasons since the applicant has deemed that the shape shown from an aesthetic point of view better adapts to the shape of shell 20 shown in the figures.

With reference to FIGS. 1, 2 and 5, according to a preferred embodiment, the first anchoring elements 30 comprise a first anchoring hole 31 provided in body 10 and a first anchoring screw 32 adapted to pass through the first anchoring hole 31. Moreover, the second anchoring elements 40 comprise a second anchoring hole 41 provided in body 10 and a second anchoring 42 adapted to pass through the second anchoring hole 41. In addition, the third anchoring elements 70 comprise a third anchoring hole 71 provided in the first anchoring arm 50 and a third anchoring screw 72 adapted to pass through the third anchoring hole 71. In addition, the fourth anchoring elements 80 comprise a fourth anchoring hole 81 provided in the second anchoring arm 60 and a fourth anchoring screw 82 adapted to pass through the fourth anchoring hole 81. According to a preferred embodiment, the first anchoring elements 30 may comprise at least one anchoring nut 33, 34, more preferably one anchoring nut 33 and a further anchoring nut 34, which are adapted to mate with the anchoring screw 32. According to a preferred embodiment, the second anchoring elements 40 may include a spacer 43 adapted to be crossed by the second anchoring screw 42 and a second anchoring nut 44 adapted to mate with the second anchoring screw 42.

According to a preferred embodiment, the first and second anchoring arm 50, 60 respectively comprise a first and a second anchoring portion 51, 61. The first anchoring portion 51 and the second anchoring portion 61 are the free end portions that respectively comprise a first flat anchoring surface 52 and a second flat anchoring surface 62. The first and second flat anchor surfaces 52, 62 are respectively associated with at least one of said third anchoring elements 70, such as hole 71, and at least one of said fourth anchoring elements 80, such as hole 81.

Figure 4:
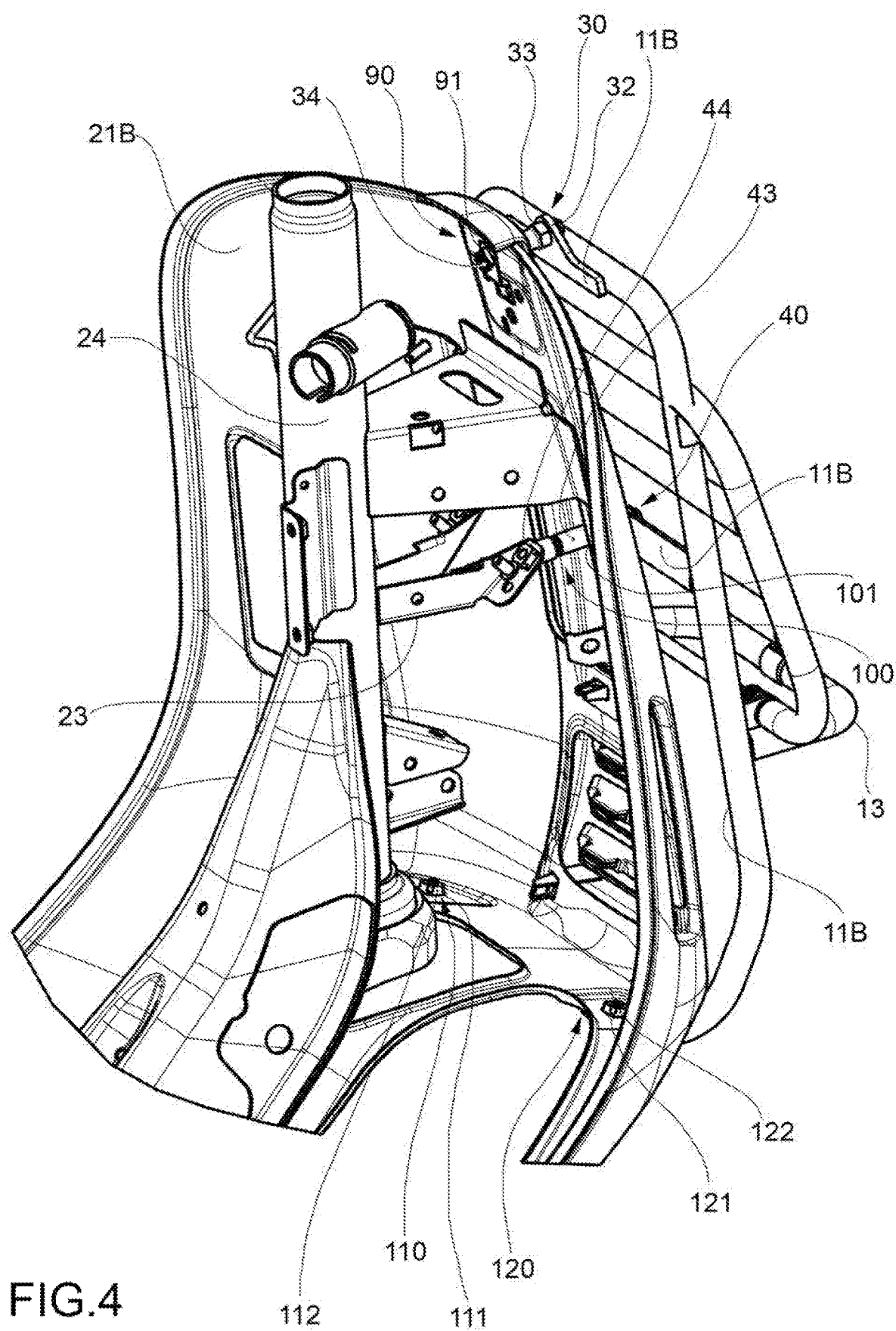
FIG. 4 shows a rear perspective view of the group of parts in FIG. 1.

According to a preferred embodiment, body 10 comprises a fastening fixing portion 11 for fixing body 10 to shell 20 and a support base 12, 13 for supporting a load to be transported. Preferably, the fixing part 11 comprises the anchoring arms 50, 60. According to a preferred embodiment, body 10 is a rack formed by a plurality of tubular elements interconnected with one another or by a plurality of interconnected bars. The support base 12, 13 is adapted to protrude from a first side 11A, or first face 11A, of the fixing part 11. The first anchoring arm 50 and the second anchoring arm 60 are configured so as to protrude at least partially from a second side 11B, or second face 11B, of the fixing part 11 which is opposite to said first side 11A. The support base 12, 13 is connected to the fixing part 11 and preferably comprises a first base part 12 base and a second base part 13. In particular, the first base part is a movable part, preferably having a generally quadrangular shape, such as a quadrangular shape with rounded corners, which is adapted to rotate around a rotation axis X1 between a rest configuration (such as in FIG. 1) and a working configuration (not shown, as known per se). The second base part 13, in the example generally "C" shaped, extends transversely to the fixing part 11 in such a way as to protrude from side 11A of the fixing part 11. Preferably, the second part 13 is a fixed part with respect to the fixing part. With reference to FIG. 4, the second part 13 extends horizontally or substantially horizontally. In the working configuration, the first base part 12 rests on the second base part 13 and preferably extends parallel or substantially parallel to the second base part 13. The second part of the base 13 also provides physical support to part 12 once that, with luggage rack open (i.e. with part 12 in the working configuration), it must support a weight of a luggage loaded on part 12.

Figure 3:
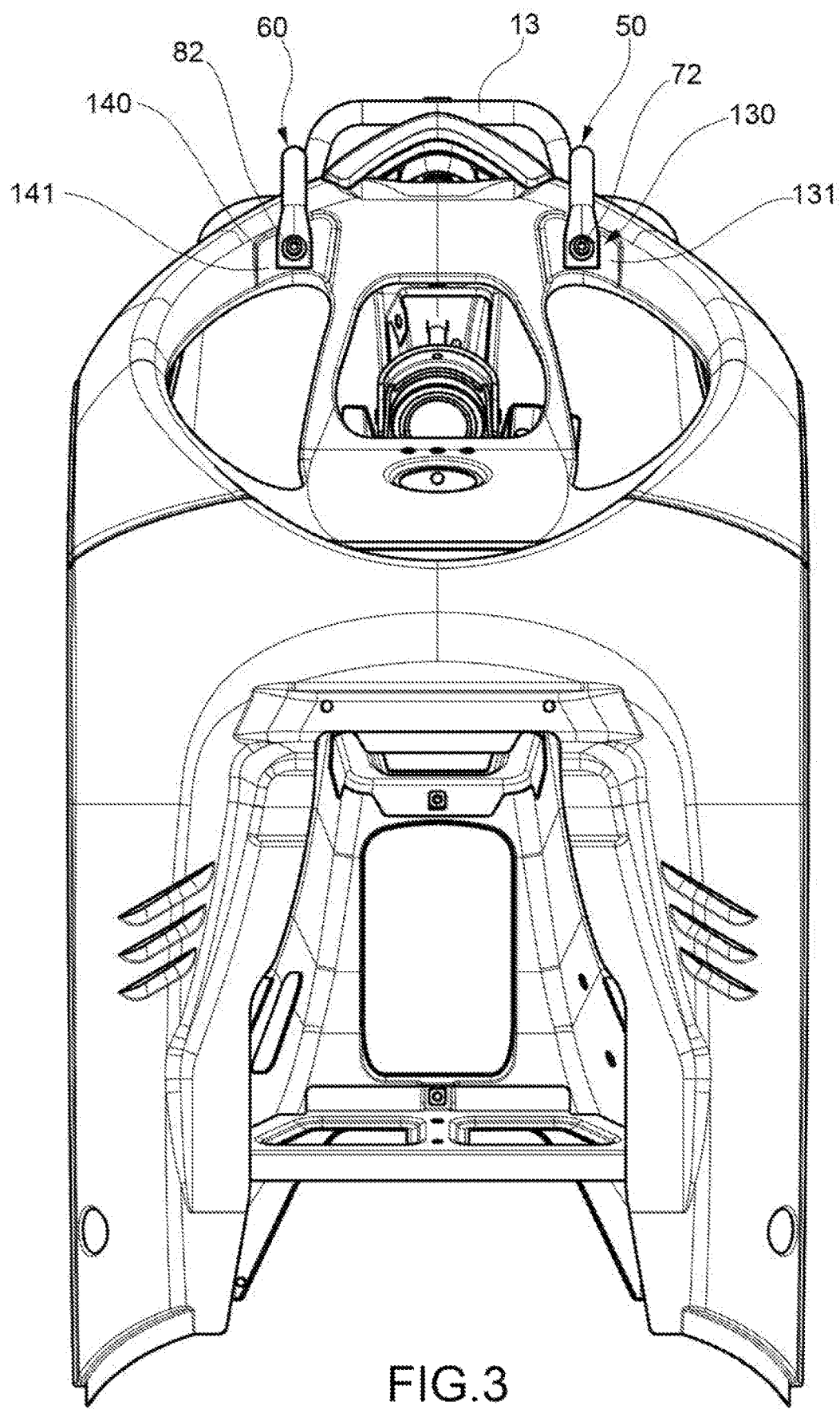
FIG. 3 shows a bottom plan view of the group of parts in FIG. 1.

With reference to FIGS. 3 and 4, shell 20 comprises a plurality of elements of conjugated anchoring elements 90, 100, 110, 120 that are configured to couple with the plurality of anchoring elements 30, 40, 70, 80 associated with the luggage rack body 10 in such a way as to allow rigidly fixing the luggage rack 1 to shell 20. The plurality of conjugated anchoring elements 90, 100, 110, 120 comprises at least a first conjugated anchoring element 91, preferably a first conjugated anchoring hole 91, and at least a second conjugated anchoring element 101, preferably a second conjugated anchoring hole 101, which are associated to the front shell part 21. Such at least first and at least second conjugated anchoring elements 91, 101 are mutually spaced apart and are configured in such a way as to allow anchoring the luggage rack 1 in two distinct points of the front shell part 21. The plurality of conjugated anchoring elements 90, 100, 110, 120 further comprises at least a third of conjugated anchoring element 111, 112 and at least a fourth conjugated anchoring element 121, 122 that are associated with the shell part 22 facing downwards. According to a preferred embodiment, the above at least one third conjugated anchoring element 111, 112 and at least a fourth conjugated anchoring element 121, 122 respectively comprise a third conjugated anchoring hole 111 and a fourth conjugated anchoring hole 121 provided on the shell part 22 and preferably they may further comprise, respectively, a third and a fourth conjugated anchoring nut 112 and 122 which are conveniently fixed stably to shell 20 coaxially to holes 111 and 121. Preferably, nuts 112 and 122 are welded to shell 20. The fact of stably fixing the third and the fourth nut to shell 20 advantageously allows facilitating the installation of the luggage rack. In fact, otherwise, it would be considerably difficult to access the area at which nuts 111 and 122 are fixed, which is preferably closed by the motorcycle counter shield plastic.

With reference to FIGS. 2 and 3, according to an advantageous embodiment, the shell part 22 facing downwards comprises a first shell anchoring portion 130 and a second shell anchoring portion 140 that respectively comprise said at least one third 111, 112 and at least one fourth 121, 122 conjugated anchoring element. The first and second shell anchoring portion 130, 140 comprise respectively a first and a second anchoring recess 130, 140.

According to an advantageous embodiment, the first and second shell anchoring portion 130, 140 comprise respectively a first flat anchoring wall 131 and a second flat anchoring wall 141 which define a bottom, respectively, of the first and second anchoring recess 130, 140.

According to a preferred embodiment, the first and second shell anchoring portion 130, 140 are made by drawing.

With reference to FIGS. 4 and 5, according to a preferred embodiment, the luggage rack 1 is fixed to shell 20 as follows. Screw 32 extends horizontally or substantially horizontally and passes through both hole 31 provided in the fixing part 11 and hole 91 provided in the front shell part 21. Nut 33, if present, is coupled to screw 32 and is interposed between the fixing part 11 and the outer face 21A of the front part 21 of shell 20 while nut 34 is coupled to screw 32 and is arranged on the side of the inner face 21B of the front part 21. Screw 42 extends horizontally or substantially horizontally and passes through both hole 41 provided in the fixing part 11 and hole 101 provided in the front shell part 21. Preferably, screw 42 also passes through spacer 43 located on the side of the inner face 21B of the front part 21 and is coupled to nut 44 so as to be fixed to shell 20, preferably by means of a bracket 23 rigidly connected to the steering tube 24 for the steering handlebar (not shown). The anchoring portions 51, 61 of the anchoring arms 50, 60 are coupled to the respective shell anchoring portions 130, 140. According to a preferred embodiment, the first and second flat anchoring surface 52, 62 are coupled respectively to the first and second flat anchoring wall 131, 141. The fact of providing the flat anchoring walls 131, 141, advantageously allows these walls 131, 141 to interface in an optimal way with the flat anchoring surfaces 52, 62, which allows ensuring a high mechanical seal of the anchoring of the luggage rack. Preferably, in order to fix the anchoring portions 51, 61 to the shell anchoring portions 130, 140, screws 72 and 82 extend vertically or substantially vertically and respectively through holes 71, 111 and holes 81, 121 in such a way as to couple respectively to nuts 112 and 122.

Figure 6:
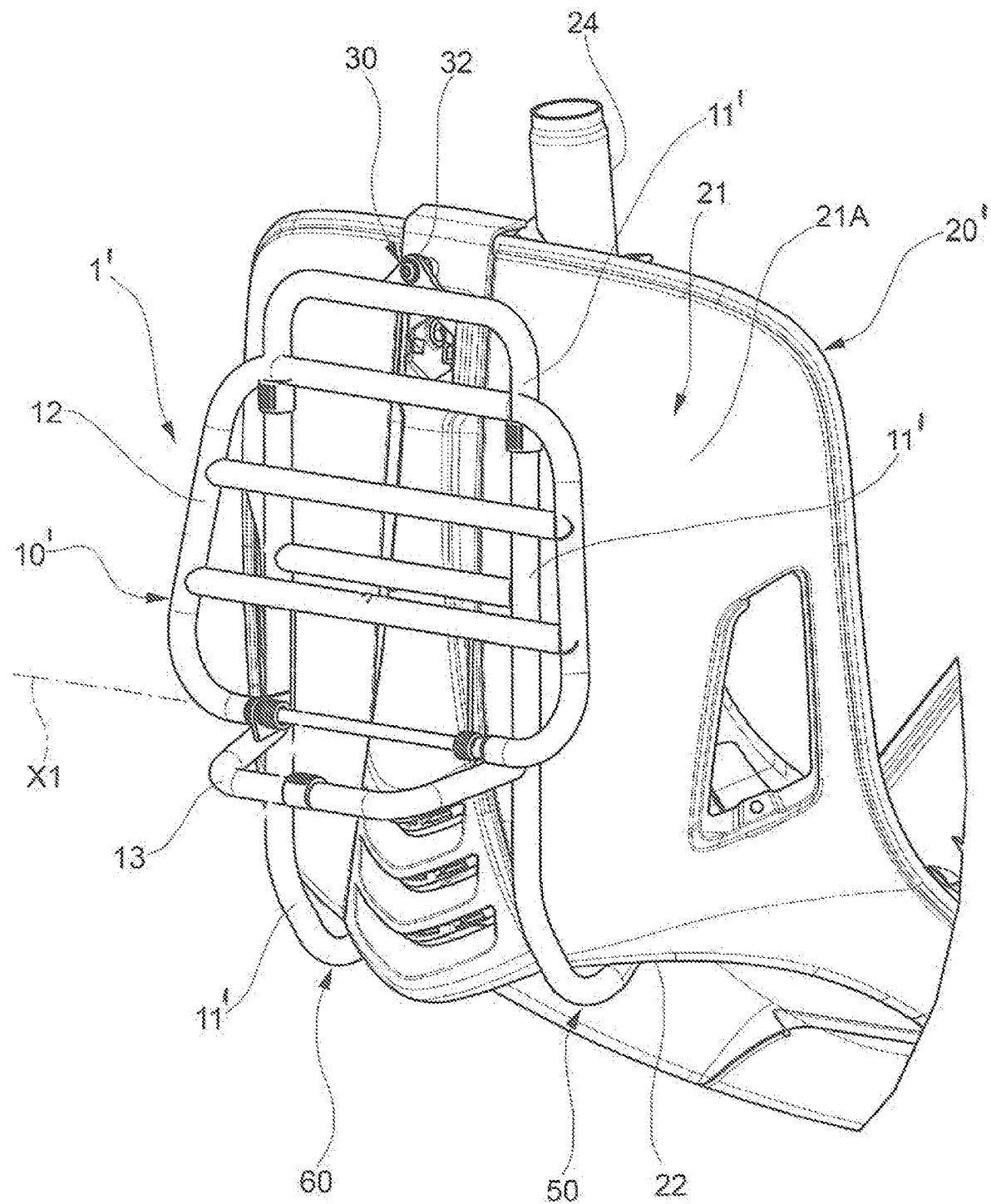
FIG. 6 is a front perspective view of a further embodiment of group of parts comprising a load-bearing shell of a motorcycle and a front luggage rack fixed to the load-bearing shell, the shell being partially shown in this figure.

Now, with reference to FIG. 6, this figure shows a combination of a front luggage rack according to a further embodiment, which has been indicated as a whole with reference numeral 1', and a load-bearing shell according to a further embodiment, which is partly shown in this figure and is indicated as a whole with reference numeral 20'. In particular, in FIG. 6, rack 1' is shown mounted to shell 20'. As can be seen from FIG. 6, rack 1' differs from rack 1 of FIG. 1 only for the fact that rack 1' does not have the anchoring elements 40. In particular, rack 1' has a luggage rack body 10' whose fixing part 11' differs from the fixing part 11 of body only for the fact that does not have the hole 41. Analogously, load-bearing shell 20' of FIG. 6 differs from load-bearing shell 20 of FIG. 1 only for the fact that does not have the second conjugate anchoring hole 101. For the sake of brevity of description, rack 1' and load-bearing shell 20' are not described herein in further detail. However, it is understood that what has been described above in connection with rack 1 and load-bearing shell 20 is applicable, mutatis mutandis, respectively also to rack 1' and load-bearing shell 20'. It is to be noted that generalizing what has been described above, in fact, it has been also described a front luggage rack for a motorcycle with a loading-bearing shell, said load-bearing shell comprising a front shell part and a shell part operatively facing downwards, said luggage rack comprising:
    a luggage rack body; and
    at least one anchoring element associated to the luggage rack body, said at least one anchoring element being configured so as to allow rigidly anchoring the luggage rack body in at least one point of the front shell part. Said luggage rack 11 being such that:
    the luggage rack body comprises a first and a second anchoring arm shaped so as to be able to be anchored to said shell part facing downwards; and
    it comprises third and fourth anchoring elements associated respectively to the first and second anchoring arm, which are configured so as to allow rigidly anchoring the first and second anchoring arm to said shell part facing downwards.

Moreover, it is to be noted that always generalizing what has been described above, in fact, it has been also described a loading-bearing shell for a motorcycle, said shell comprising:
    a front shell part and a shell part operatively facing downwards;
    a plurality of conjugate anchoring elements configured to mate with a plurality of anchoring elements associated with a luggage rack body of a front luggage rack for said motorcycle so as to allow rigidly fixing said luggage racks to said shell;
    said plurality of conjugate anchoring elements comprising at least one conjugate anchoring element that is associated to the front shell part, said at least one conjugate anchoring element being configured so as to allow anchoring of said luggage rack in at least one point of the front shell part;
    said plurality of conjugate anchoring elements being such that they comprise at least one third and at least one fourth conjugate anchoring element that are associated to said shell part facing downwards.

According to what described above, it is therefore possible to understand how a luggage rack of the type described above allows achieving the objects mentioned above with reference to the prior art.

In fact, due to the fact of providing a pair of anchoring arms configured in such a way as to be anchored to the shell part facing downwards and anchoring elements associated with such anchoring arms, it is advantageously possible to anchor the luggage rack to the shell without the need to providing the support pads of the prior art. In this way, in addition to ensuring a particularly stable fixing of the rack to the shell, a luggage rack according to the present description advantageously allows overcoming the drawbacks due to the presence of the prior art pads discussed above and keeping the anchoring portions of the anchoring arms to the shell substantially hidden in the lower part of the shell.

The principle of the disclosure being understood, the manufacturing details and the embodiments may widely vary compared to what described and illustrated by way of a non-limiting example only, without departing from the scope of the disclosure as defined in the accompanying claims.

The invention claimed is:

1. A front luggage rack for a motorcycle with a loading-bearing shell, said load-bearing shell comprising a front shell part and a shell part operatively facing downwards, said luggage rack comprising:
    a luggage rack body; and
    at least one anchoring element associated to the luggage rack body, said at least one anchoring element being configured so as to allow rigidly anchoring the luggage rack body in at least one point of the front shell part;

wherein the luggage rack body comprises a first and a second anchoring arm shaped so as to be able to be anchored to said shell part facing downwards; and the luggage rack body further comprising third and fourth anchoring elements associated respectively to the first and second anchoring arm, which are configured so as to allow rigidly anchoring the first and second anchoring arm to said shell part facing downwards;

wherein the first and the second anchoring arm respectively comprise a first and a second anchoring portion and wherein said anchoring arms are configured so that said anchoring portions remain hidden in the lower part of the shell when the luggage rack is anchored to the shell such that the first and second anchoring portions are not visible during use of the luggage rack.

2. The front luggage rack according to claim 1, wherein said at least one anchoring element associated to the luggage rack body and configured so as to allow rigidly anchoring the luggage rack body in at least one point of the front shell part comprises first and second anchoring elements associated to the luggage rack body, the first and second anchoring elements being spaced apart and configured so as to allow rigidly anchoring the luggage rack body in two distinct points of the front shell part.

3. The front luggage rack according to claim 2, wherein the first and second anchoring elements are interposed between the first and the second anchoring arm.

4. The front luggage rack according to claim 2, wherein the first anchoring elements comprise a first anchoring hole provided in the luggage rack body and a first anchoring screw suitable to pass through the first anchoring hole, the second anchoring elements comprise a second anchoring hole provided in the luggage rack body and a second anchoring screw suitable to pass through the second anchoring hole (41), the third anchoring elements comprise a third anchoring hole provided in the first anchoring arm and a third anchoring screw suitable to pass through the third anchoring hole and the fourth anchoring elements comprise a fourth anchoring hole provided in the second anchoring arm and a fourth anchoring screw suitable to pass through the fourth anchoring hole.

5. The front luggage rack according to claim 1, wherein the luggage rack body comprises a fixing part to secure the luggage rack body to said shell and a support base to support a load to be transported that is connected to the fixing part, wherein the support base is suitable to protrude from a first side of the fixing part and wherein the first and the second anchoring arm are shaped so as to protrude at least partially from a second side of the fixing part opposite to said first side.

6. The front luggage rack according to claim 1, wherein the first and the second anchoring arm respectively comprise a first and a second anchoring portion, the first and the second anchoring portion being free end portions that respectively comprise a first and a second flat anchoring surface, to the first and second flat anchoring surface being respectively associated at least one of said third the anchoring elements and at least one of said fourth anchoring elements.

7. A combination of a front luggage rack for a motorcycle with a load-bearing shell as defined in claim 1 and a load-bearing shell comprising a front shell part and a shell part operatively facing downwards; and a plurality of conjugate anchoring elements configured to mate with a plurality of anchoring elements associated with a luggage rack body of a front luggage rack for said motorcycle so as to allow rigidly fixing said luggage racks to said shell;

said plurality of conjugate anchoring elements comprising at least one conjugate anchoring element that is associated to the front shell part, said at least one conjugate anchoring element being configured so as to allow anchoring of said luggage rack in at least one point of the front shell part, said plurality of conjugate anchoring elements comprise at least one third and at least one fourth conjugate anchoring element that are associated to said shell part facing downwards.

8. A motorcycle comprising the combination defined in claim 7.

9. A loading-bearing shell for a motorcycle, said shell comprising:

a front shell part and a shell part operatively facing downwards; and a plurality of conjugate anchoring elements configured to mate with a plurality of anchoring elements associated with a luggage rack body of a front luggage rack for said motorcycle so as to allow rigidly fixing said luggage rack to said shell;

said plurality of conjugate anchoring elements comprising at least one conjugate anchoring element that is associated to the front shell part, said at least one conjugate anchoring element being configured so as to allow anchoring of said luggage rack in at least one point of the front shell part, said plurality of conjugate anchoring elements comprise at least one third and at least one fourth conjugate anchoring element that are associated to said shell part facing downwards;

wherein said at least one conjugate anchoring element that is associated to the front shell part comprises at least a first and at least a second conjugate anchoring element that are associated to the front shell part, said at least a first and at least a second conjugate anchoring elements being spaced apart and configured so as to allow anchoring of said luggage rack in two distinct points of the front shell part; and wherein said shell part facing downwards comprises a first and a second shell anchoring portion that comprise respectively said at least one third and at least one fourth conjugate anchoring element, said first and second shell anchoring portion respectively comprise a first and a second anchoring recess.

10. The load-bearing shell according to claim 9, wherein said first and second anchoring portion of the shell respectively comprise a first and a second flat anchoring wall that define a bottom respectively of the first and second anchoring recess.

11. The load-bearing shell according to claim 9, wherein said at least one third conjugate anchoring element and at least one fourth conjugate anchoring element comprise respectively:

a third conjugate anchoring hole and a fourth conjugate anchoring hole that are provided with said shell part facing downwards; and a third and a fourth conjugate anchoring nut that are firmly fixed to said shell coaxially to said third and fourth conjugate anchoring hole.

* * * * *